G. W. POINTER.
ADJUSTABLE ROAD GRADER DRAG.
APPLICATION FILED AUG. 25, 1908.
927,071.
Patented July 6, 1909.
3 SHEETS—SHEET 3.
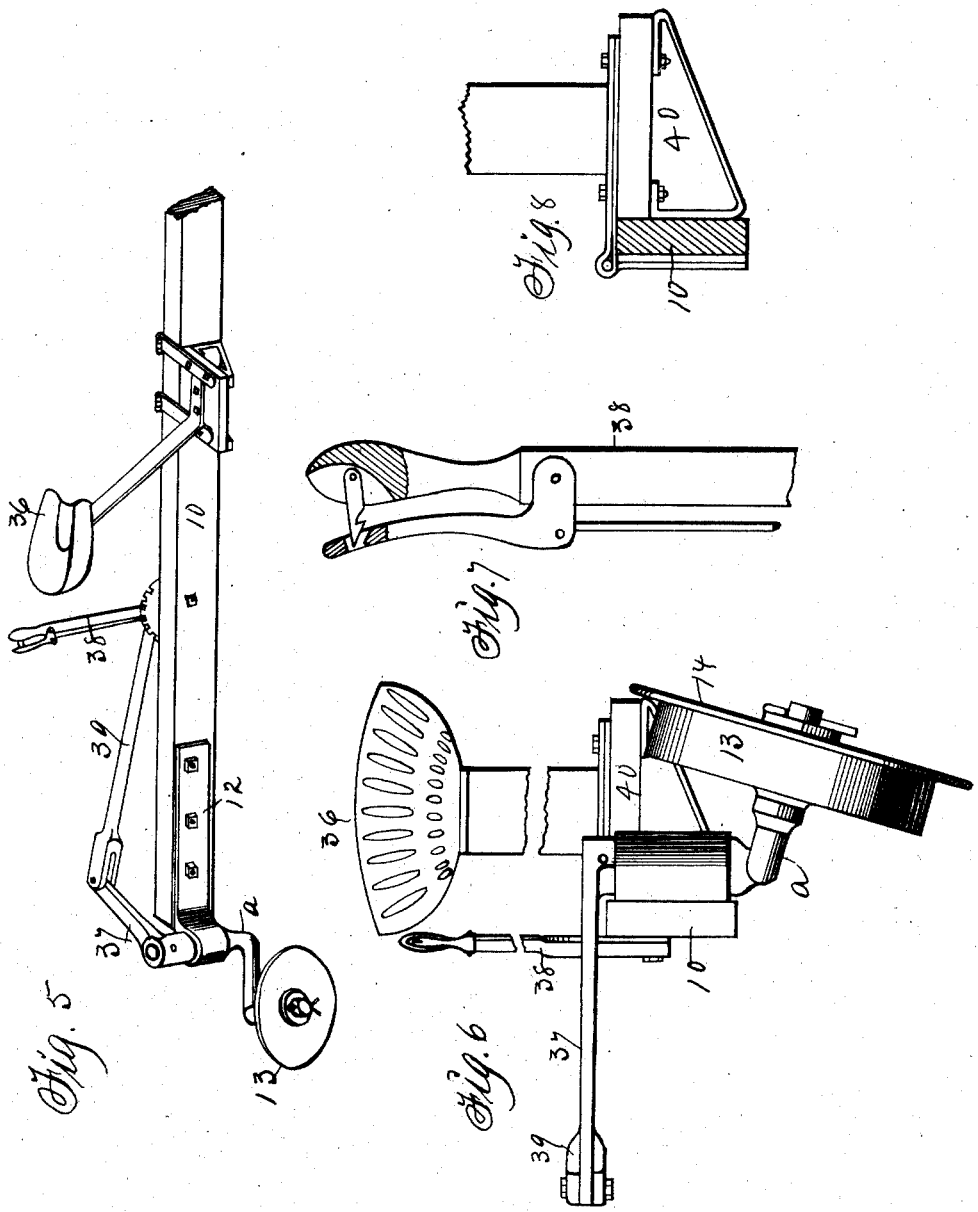

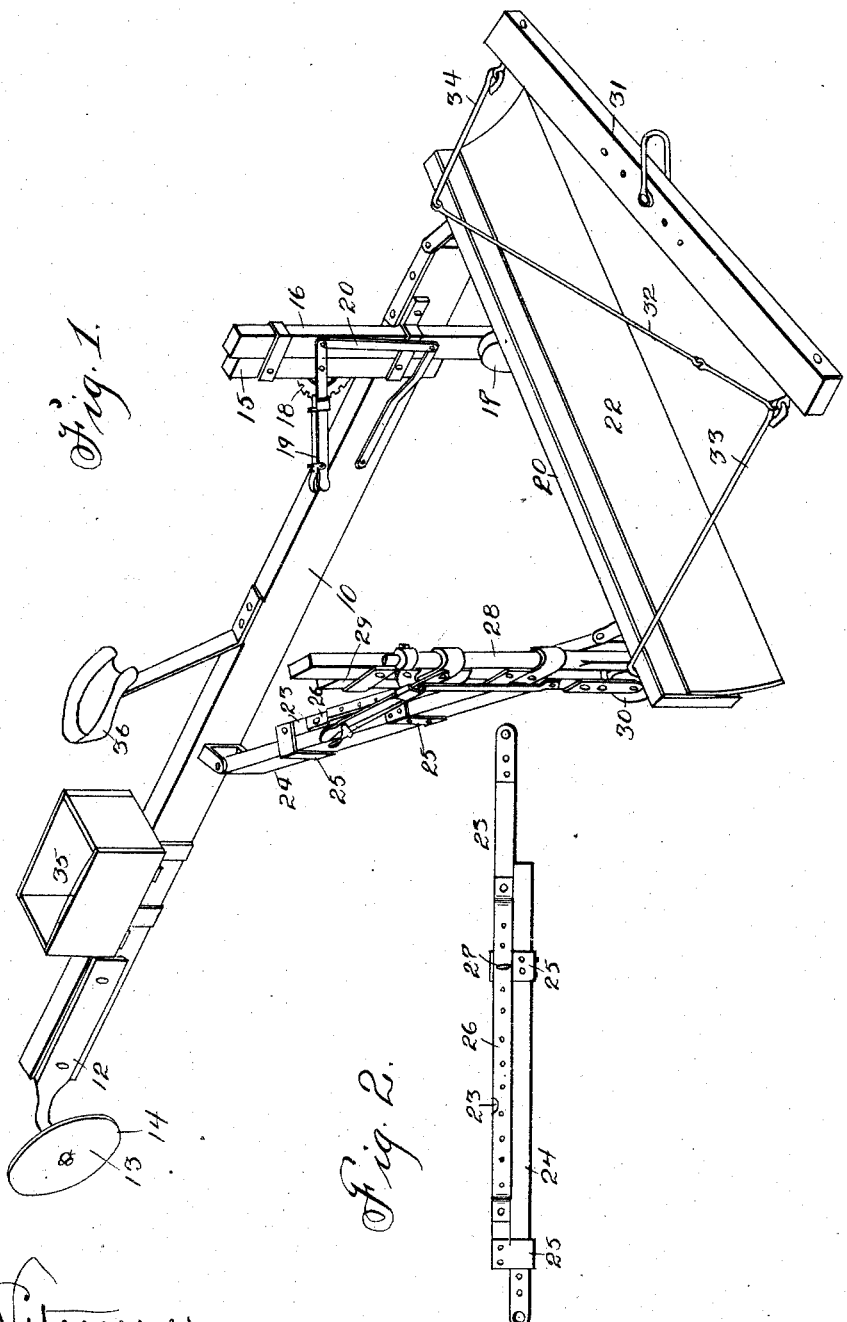

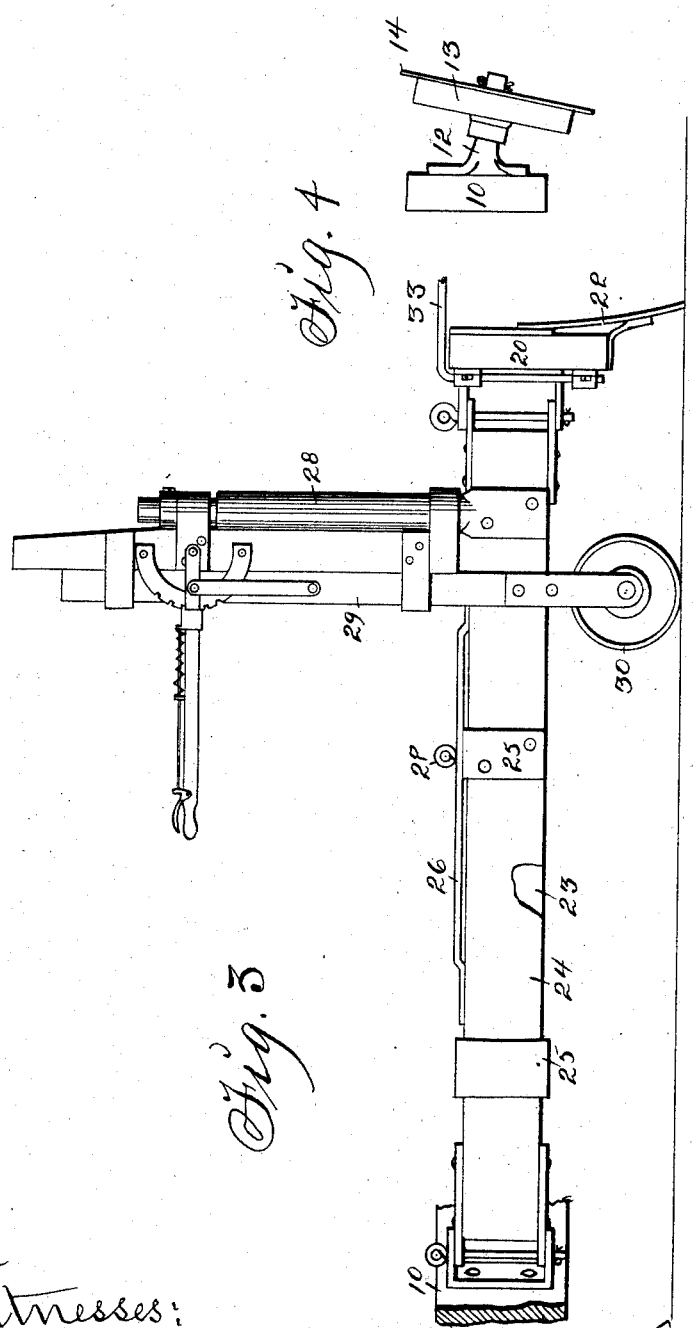

UNITED STATES PATENT OFFICE.

GEORGE W. POINTER, OF CAMBRIDGE, IOWA.

ADJUSTABLE ROAD-GRADER DRAG.

No. 927,071.  Specification of Letters Patent.  Patented July 6, 1909.

Application filed August 25, 1908. Serial No. 450,581.

*To all whom it may concern:*

Be it known that I, GEORGE W. POINTER, a citizen of the United States, residing at Cambridge, in the county of Story and State of Iowa, have invented a new and useful Adjustable Road-Grader Drag, of which the following is a specification.

My road drag is designed for advantageously grading roads by scraping ground from the sides toward the center and keeping them smooth and rounded higher at the center than at the sides.

My invention consists in the construction, arrangement and combination of parts so the angle of the scraper can be readily adjusted relative to the line of advance, readily raised and lowered relative to the frame that supports the scraper and adjusting mechanism, as hereinafter set forth, pointed out in my claims and illustrated in the accompanying drawings, in which:—

Figure 1 is a perspective view of the machine in position as required for practical use. Fig. 2 shows an adjustable reach for connecting the free end of the scraper with the rear end portion of the main part of the frame. Fig. 3 is an enlarged side view of the frame that shows the free end of the scraper connected with the rear end portion of the main part of the frame by means of the adjacent reach. It also shows a portion of the vertically adjustable mechanism. Fig. 4 is a detail view that shows a wheel connected with the rear end of the main part of the frame as required for supporting the frame elevated. Fig. 5 shows a driver's seat connected with the beam and also means within reach of the seat for adjusting the wheel at the rear end of the beam. Fig. 6 shows the rear end of the beam and a rear view of the seat and wheel connected with the beam. Fig. 7 shows a latching device for the lever used for adjusting and retaining the axle of the wheel at the rear end of the beam stationary. Fig. 8 shows means for retaining the seat at the side of the beam.

The numeral 10 designates a straight beam, preferably made of wood and about 8 feet long. To the inside of the rear end of the beam is fixed as tub axle 12 or an adjustable axle $a$ as shown in Figs. 5 and 6, and on the axle is mounted a wheel 13, and from the wheel projects a flange 14 that will sink in the ground and prevent any lateral motion of the rear end of the beam 10 when the machine is in operation.

To the front and inside portion of the beam 10 is fixed an upright 15 and with said upright is adjustably connected a standard 16 that carries a wheel 17 at its lower end. To the upright 15 is fixed a segmental rack 18 and a lever 19 pivoted thereto and connected with the standard 16 by a link 20 as required for raising and lowering the standard 16 and adjusting the scraper connected with the front end of the beam 10 when the machine is in operation.

A scraper consisting of a straight bar 20 and a metal blade 22 is hinged to the front end of the beam 10, as shown in Fig. 3, or in any suitable way and adjustably connected at its other end with the beam 10 by means of an adjustable reach hinged to the scraper and the beam, as shown in Figs. 1 and 3. The reach consists of two straight bars 23 and 24 slidably connected by loops 25. On top of the bar 24 is fixed a metal strip 26 and it has a plurality of pin holes through which a pin 27 is passed into a hole in the bar as required for locking the two bars together. To the adjustable reach is fixed an upright 28 and to said upright is connected a standard 29 that carries a wheel 30 to be raised and lowered by means of a lever and rack in the same manner as the standard 20 is adjusted relative to the beam 10.

For hitching horses to the machine an evener 31 is flexibly connected with the bar 20 that carries the scraper 22 by means of a jointed rod 32 and links 33 and 34, as shown in Fig. 1, or in any suitable way.

On the rear end of the beam 10 is mounted a box 35 for carrying weights whenever required for governing the steady advance of the machine over loose or uneven ground. A seat for a driver (36) is mounted on the beam as shown in Fig. 1.

To the adjustable axle $a$ carrying the wheel 13 is fixed a crank 37 and connected with a lever 38 fulcrumed to the beam 10 and 39 is a link pivotally connected with said lever and crank as shown in Fig. 5.

A seat support 40 is fixed to the beam 10 and the seat 36 mounted thereon as shown in Fig. 5.

Having thus set forth the purposes of my invention and the construction, arrangement and functions of the different parts the practical operation and utility of the machine will be obvious.

What I claim as new and desire to secure by Letters-Patent, is:

1. In an adjustable road scraper drag, a straight beam, a road scraper hinged to the front end of the beam and wheels connected with the beam to support it, a wheel carried at its rear end and an adjustable standard at its front end carrying a wheel for raising and lowering the beam and scraper as set forth.

2. In an adjustable road scraper drag, a straight beam, a road scraper hinged to the front end of the beam and wheels mounted with the beam to support it, a wheel carried at its rear end and an adjustable standard at its front end carrying a wheel for raising and lowering the beam and scraper and an adjustable reach hinged to the free end of the scraper and the rear portion of the beam, to operate as set forth.

3. An adjustable road scraper drag comprising a straight beam supported upon wheels attached thereto, a scraper hinged to the front end of the beam, an adjustable reach hinged to the free end of the scraper and to the rear end portion of the beam, an evener flexibly connected with the scraper for hitching horses to the scraper and an adjustable standard carrying a wheel connected with the beam, to operate as set forth.

4. An adjustable road scraper drag comprising a straight beam supported upon wheels attached thereto, a scraper hinged to the front end of the beam, an adjustable reach hinged to the free end of the scraper and to the rear end portion of the beam, an evener flexibly connected with the scraper for hitching horses to the scraper, an adjustable standard carrying a wheel connected with the beam and an adjustable standard carrying a wheel connected with the adjustable reach, to operate as set forth.

5. An adjustable road scraper drag, comprising a straight beam supported upon wheels attached thereto, a scraper hinged to the front end of the beam, an adjustable reach hinged to the free end of the scraper and to the rear end portion of the beam, an evener flexibly connected with the scraper for hitching horses to the scraper, an adjustable standard carrying a wheel connected with the beam, an adjustable standard carrying a wheel connected with the adjustable reach, and a box on the rear end of the beam, to operate as set forth.

6. An adjustable road scraper drag comprising a straight beam supported upon wheels attached thereto, a scraper hinged to the front end of the beam, an adjustable reach hinged to the free end of the scraper and to the rear end portion of the beam, an evener flexibly connected with the scraper for hitching horses to the scraper, an adjustable standard carrying a wheel connected with the beam, an adjustable standard carrying a wheel connected with the adjustable reach, a box on the rear end of the beam and a seat mounted on the beam, to operate as set forth.

GEORGE W. POINTER.

Witnesses:
F. W. LARSON,
W. T. EGGEN.